United States Patent [19]

Stevens

[11] Patent Number: 5,214,508

[45] Date of Patent: May 25, 1993

[54] SPATIAL BANDWIDTH TESTING FOR DIGITAL DATA-COMPRESSED VIDEO SYSTEMS

[75] Inventor: Douglas C. Stevens, Portland, Oreg.

[73] Assignee: Tektronix, Inc., Wilsonville, Oreg.

[21] Appl. No.: 834,963

[22] Filed: Feb. 14, 1992

[51] Int. Cl.$^5$ .......................................... H04N 17/00
[52] U.S. Cl. .................................... 358/139; 382/43; 382/17
[58] Field of Search .................... 358/139, 10, 107; 382/17, 18, 43, 29; 371/27

[56] References Cited

U.S. PATENT DOCUMENTS

| | | | |
|---|---|---|---|
| 4,843,631 | 6/1989 | Steinpichler et al. | 382/17 X |
| 4,855,826 | 8/1989 | Wischermann et al. | 358/139 |
| 5,038,210 | 8/1991 | Deckelmann et al. | 358/139 |
| 5,101,441 | 3/1992 | Yamaguchi | 382/43 X |

Primary Examiner—Victor R. Kostak
Attorney, Agent, or Firm—Francis I. Gray

[57] ABSTRACT

Spatial bandwidth testing for digital data-compressed video systems is performed using a complex, or high entropy, test signal. A portion of the test signal is acquired as a control frame. This control frame is divided into a plurality of blocks. Each block is processed by a two-dimensional Discrete Fourier Transform (DFT). The test signal is input to a digital data-compressed video system and a corresponding portion of the output of the video system, a test frame, is acquired and processed in the same manner as the control frame. The resulting coefficient arrays from the control and test frames are compared to each other to obtain an output array of ratios for each block. The ratio of those coefficients corresponding to the predominant frequency of each block of the control frame are displayed as a three-dimensional gain plot. The ratio of those coefficients corresponding to low frequencies of each block of the control frame are displayed as a three-dimensional noise plot. The resulting plots provide an objective, visual indication of the characteristics of the digital data-compressed video system.

9 Claims, 8 Drawing Sheets

SPATIAL BANDWIDTH TESTING FOR DIGITAL DATA-COMPRESSED VIDEO SYSTEMS

BACKGROUND OF THE INVENTINO

The present invention relates to the testing of data-compressed video systems, and more particularly to spatial bandwidth testing for digital data-compressed video systems for analyzing distortion of transmitted video images resulting from the data compression.

Data-compressed video systems, such as video coders/decoders (codecs), use data compression techniques in the transmission of video images to meet the bandwidth limitations of the transmission medium. Analog systems suffer from well understood phenomena, such as gain error, high frequency roll-off, group delay error and non-linear effects. These distortions are a function neither of the signal being transmitted nor of the signals previously transmitted, and they are amenable to analysis with traditional test equipment. Digital data-compressed video systems, however, produce distortions that are a function both of the signal being transmitted and of signals previously transmitted. The distortions are a function of the spatial and temporal complexity of the transmitted image. Images with higher entropy, i.e., randomness or lack of predictability, generally suffer more distortion. Traditional test signals suffer little distortion since they have low entropy—such signals are highly correlated along at least one axis.

Test methods are needed that use high entropy signals. Unfortunately the very complexity of such signals makes them difficult to analyze numerically. Therefore most testing of digital data-compressed video systems has involved subjective testing of complex picture material by a group of trained observers. This testing is expensive, complex to set up and, as it requires a highly controlled environment and the presence of the trained team, is not easily reproduced at any arbitrary location.

Another recent attempt for testing digital data-compressed video systems is disclosed in U.S. patent application Ser. No. 07/663,220 filed Mar. 1, 1991 by Michael S. Overton et al entitled "Three-Dimensional Testing of Video Codecs." The test signal used is a conventional test signal over a complex background signal, such as a pseudo-random noise signal or a zoneplate signal. A conventional measurement system, such as a waveform monitor or oscilloscope, displays the conventional test signal, with distortions caused by the complex background signal appearing in the display. The measurement instrument may be a spectrum analyzer where the background signal is a zoneplate signal.

What is desired is spatial bandwidth testing for digital data-compressed video systems that uses a high entropy test signal to provide an objective characterization of system distortions.

SUMMARY OF THE INVENTION

Accordingly the present invention provides spatial bandwidth testing for digital data-compressed video systems using a complex test signal that varies spatially and temporally. The complex test signal is applied to a digital data-compressed video system, and a portion of the output of the system is captured. The captured video portion is subdivided into small blocks of pixels and a two-dimensional Discrete Fourier Transform (DFT) is applied to each block. The resulting array of coefficients, representing the phase and magnitude of each spatial frequency in the block, is compared to a coefficient array for a corresponding captured portion of the complex test signal at the input of the system. The resulting comparison is displayed in an appropriate format to indicate both the gain and noise response of the digital data-compressed video system.

The objects, advantages and other novel features of the present invention are apparent from the following detailed description when read in conjunction with the appended claims and attached drawing.

DESCRIPTION OF THE PREFERRED EMBODIMENT

Figure 1:
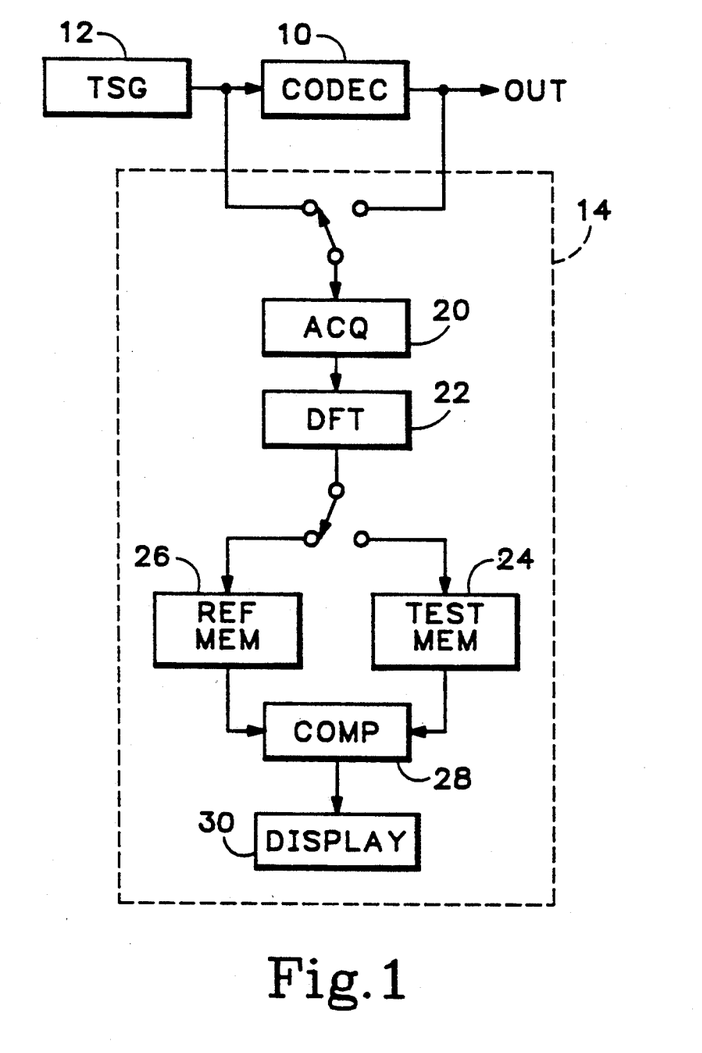
FIG. 1 is a block diagram of a system for spatial bandwidth testing of a digital data-compressed video system according to the present invention.
Figure 2:
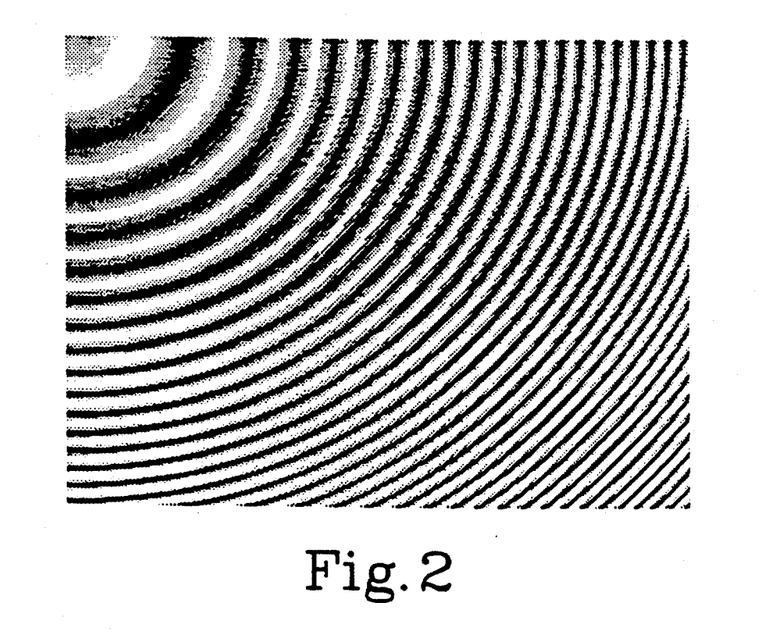
FIG. 2 is a display of a test signal that is used for spatial testing of a digital data-compressed video system according to the present invention.

Referring now to FIG. 1 a digital data-compressed video system 10, such as a video cod®r/decoder (codec), to be tested receives a complex, or high entropy, test signal from a test signal generator 12. Both the complex test signal from the test signal generator 12 and the output from the codec 10 are applied to a test instrument 14 for analysis of the gain and noise characteristics of the video system. A test signal that may be used is a variant of a zoneplate bull's-eye, as shown in FIG. 2, where the lowest spatial frequencies, normally in the center of a video image, are located in the upper left-hand corner of the video image. This test signal contains a range of horizontal spatial frequencies, increasing from left to right, and vertical spatial frequencies, increasing from top to bottom. There is little redundancy in this image, i.e., there are no two regions within the image in which the combination of horizontal and vertical frequencies is the same. Because some data-compressed video systems transmit high entropy images by gradually increasing the resolution of the image over several frames for static images, a temporal component is added to the signal. Thus the zoneplate signal is a sinusoidal output according to the equation:

$$phase = 2*pi*(k+k*x + k_{ks}*x^2 + k_{xt}*x*t + k_{ay}*x*y + k_y*y + k_{ys}*y^2 + - k_{yt}*y*t + k_t*t = t + k_{ts}*t^2)$$

where x is the horizontal location, y is the vertical location, and t is the temporal location of the image pixel, i.e., t is the time within a sequence of images from a start of the sequence at t=0. The temporal component has the effect of continuously moving the lines within the image, with the speed being adjusted to challenge systems that estimate block motion Also to test for video systems that might handle diagonal information with one tilt differently from diagonal information with the opposing tilt, the zoneplate test signal may be modified by adjusting the Ky and Ky$^2$ coefficients so that the [0,0] frequency occurs at the center of the left-hand side of the video image.

With this test signal applied to the video system 10, a portion of the video output from the system is captured by an acquisition system 20 of the test instrument 14. The captured video portion is subdivided into small blocks of pixels, such as 32 pixels wide by 16 pixels high. Each block is input to a two-dimensional Discrete Fourier Transform (DFT) circuit 22. The DFT circuit 22 calculates a real-valued DFT for each row of pixels within the block to produce an array of sixteen rows each containing sixteen complex coefficients representing the amplitude and phase of the horizontal frequencies in the block. Next a complex-valued DFT is calculated for each column of complex coefficients in the block. This also results in an array of sixteen rows with sixteen complex coefficients representing the amplitude and phase of the two-dimensional spatial frequencies in the block. The resulting test array of coefficients is stored in a test memory 24.

The above calculations are repeated for a corresponding control video portion of the complex test signal at the input of the video system 10 to produce a ref®rence array of coefficients. The reference array of coefficients is stored in a reference memory 26. Each block of the reference array has peak coefficient values for a small number of spatial frequencies, with other frequencies having very low values. For example a block at the upper left-hand corner of the image of FIG. 2 has a high coefficient for the frequencies near [0,0], shorthand notation for horizontal frequency=0 and vertical frequency=0. A block at the lower right-hand corner has a high value for frequencies near [20,20], where spatial frequencies are expressed in cycles per active picture height (aph). A horizontal spatial frequency of 20 cycles/aph corresponds to 20*(4/3), or 26.7 cycles per active picture width for an image having a 4:3 aspect ratio, such as NTSC.

Although FIG. 1 shows the acquisition circuit 2o and DFT circuit 22 being switched between the two inputs and between the two memories 24, 26, two acquisition circuits and DFT circuits may be used so that the reference and test arrays are obtained in parallel rather than one after the other. Also the memories 24, 26 may be different areas of a single memory device.

To determine the spatial bandwidth of the digital data-compressed video system 10, the test arrays are input to a comparator 28 together with the corresponding reference arrays. The ratio between the values of the coefficients in the test array and the reference array is calculated for each block for those frequencies that predominate in that block in the reference array. For example the predominant frequencies in a given block may be defined as those having coefficients exceeding 75% of the amplitude of the largest coefficient in the block. An ideal digital data-compressed video system without distortion has a ratio of 1.0 for each frequency involved.

To determine the noise contribution of the video system 10, the differences betWeen the values of the coefficients for the test array and the reference array are calculated for each block for those frequencies that have near zero coefficients in that block of the control frame. For example the noise frequencies in a given block may be those having coefficients less than 5% of the amplitude of the largest coefficient in the block. The ratio between this difference and the value of the largest coefficient in the block is calculated. An ideal digital data-compressed video system without noise has a ratio of 0.0 for each frequency involved A display system 3o performs the processing of the ratio information from the comparator 28.

A simple flowchart for the calculation of coefficients and the corresponding ratios may be as follows:

```
max_coefficient_value = 0.0
for each row r in the block of control coefficients
{
    for each column c in the row {
        if control_value[r] [c] >
        max_coefficient_value {
            max_coefficient_value =
            control_value[r] [c];
        }
    }
}
for each row r in the block of test coefficients {
    for each column c in the row {
        if control value[r] [c] >
        (0.75*max_coefficient_value {
            gain[r] [c] = abs(test_value[r] [c]/
                        control_value[r] [c])
        }
        if control_value[r] [c] <
        (0.05*max_coefficient_value) {
            noise[r] [c] = (abs(test_value[r] [c] —
                         control_value[r] [c])/
                         max_coefficient_value)
        }
    }
}
```

After gain[r][c] and noise[r][c] values are collected for each block of pixels, the final value for Gain[r][c] is calculated as the mean and standard deviation of the collection of gain[r][c] values, and the final value for Noise[r][c] is calculated as the maximum of the noise[r][c] values.

Figure 3:
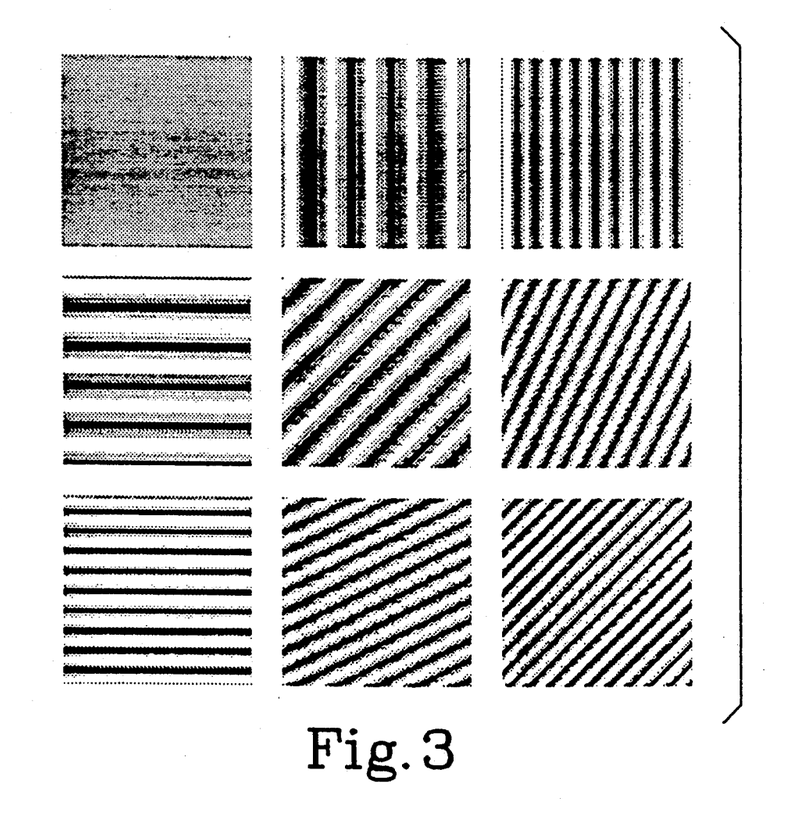
FIG. 3 is a pictorial representation of a simple coefficient array according to the present invention.

The spatial bandwidth and noise values determined above may then plotted by the display system 30 as three-dimensional bar charts, as shown in FIGS. 4–9. The coefficient for frequency [0,0] appears in the back row at the left-hand side of the display. This corresponds to the average DC level of each block tested. The coefficient for the highest horizontal frequency with no vertical frequency component, i.e., closely spaced vertical bars, appears in the back row at the right-hand side. The coefficient for the highest vertical frequency with no horizontal component, i.e., closely spaced horizontal bars, appears in the front row at the left-hand side, and that for the highest combined frequency, i.e., closely spaced diagonal bars, appears at the front row at the right-hand side. As an example, referring to FIG. 3 for a three by three matrix, the bars would correspond to the amplitude of the spatial frequencies shown. In the 3-D plots of FIGS. 4–9 the height of the bar is directly related to the value of the coefficient. In the frequency response plot a reference "1.0" bar is shown to the right of the plot corresponding to the largest amplitude coefficient for the reference array block. Ideally the frequency response plot would show all bars at the same height as the reference bar. In the noise amplitude plots a reference "0.1" bar is shown to the right of the plot, and ideally all bars would have zero amplitude.

Figure 4:
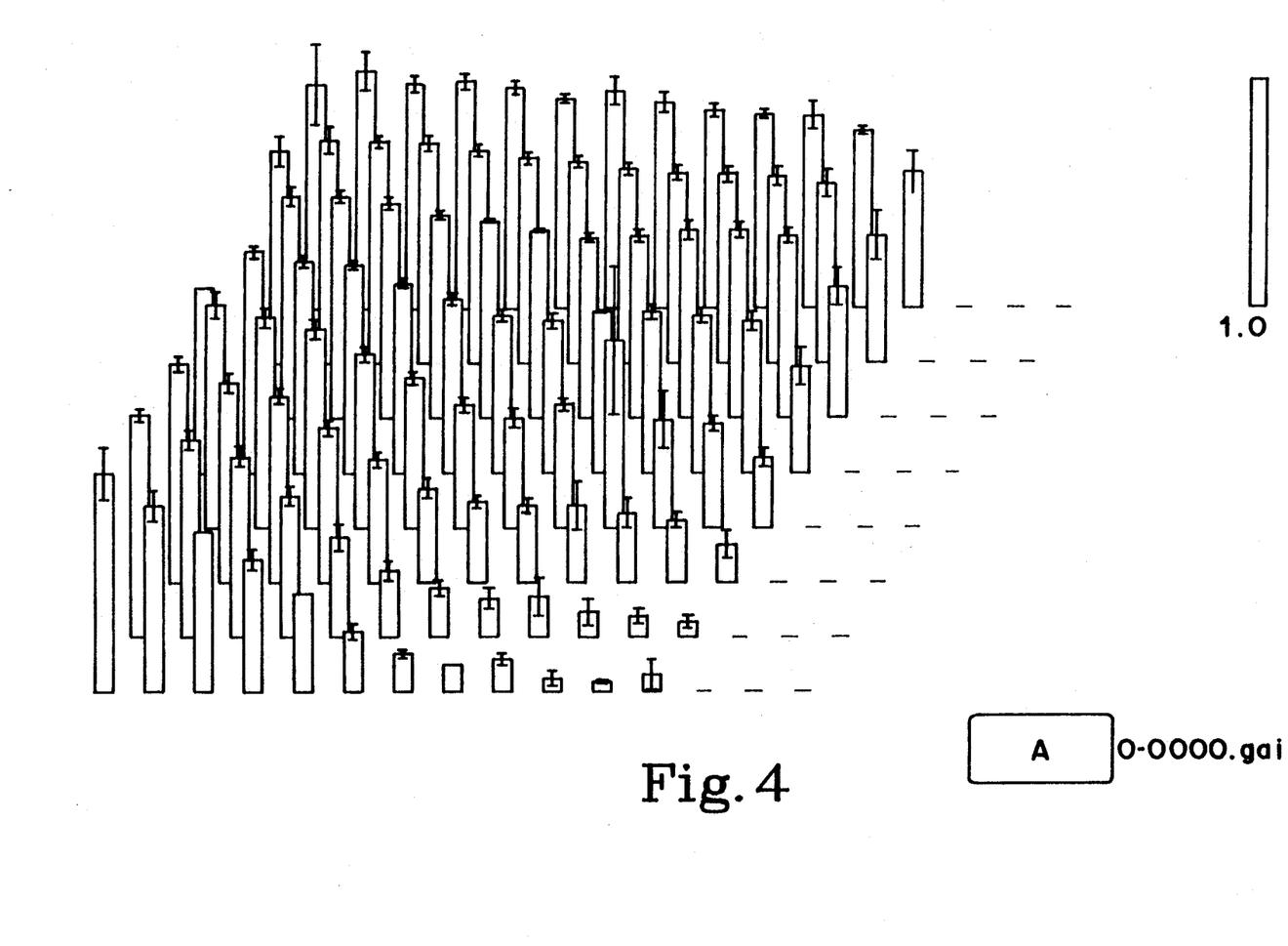
FIGS. 4–9 are plots of the test results for a pair video codecs indicating both gain and noise characteristics according to the present invention.
Figure 5:
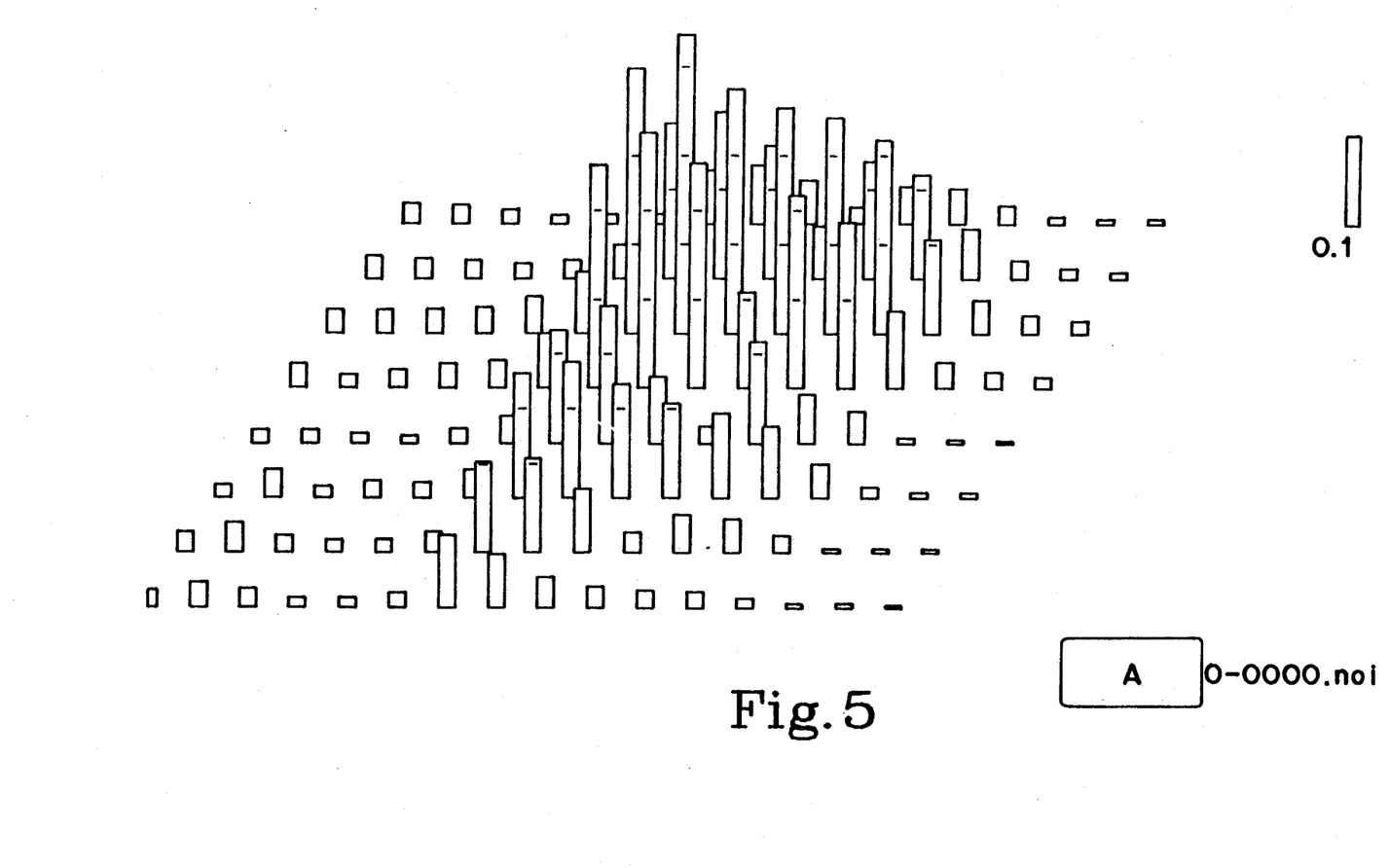

The plots of FIGS. 4–9 represent the responses of a pair of different video codecs, referenced by letters A and C For sequences where there is temporal movement of the test signal, the video codec output frame having the same phase as the control frame is the source of the video portion acquired for processing. The brackets at the tops of the frequency response bars represent standard deviation of the coefficients. Also dotted lines appear in place of bars at some places in the plot, representing spatial frequencies with amplitudes less than 75% of the maximum amplitude in every block of the control frame. FIGS. 4 and 5, marked A0-000.gai and A0-000.noi show frequency response and noise plots for a first video codec without motion. This codec shows marked attenuation of high diagonal frequencies, and relatively high noise contribution from a number of diagonal frequencies.

Figure 7:
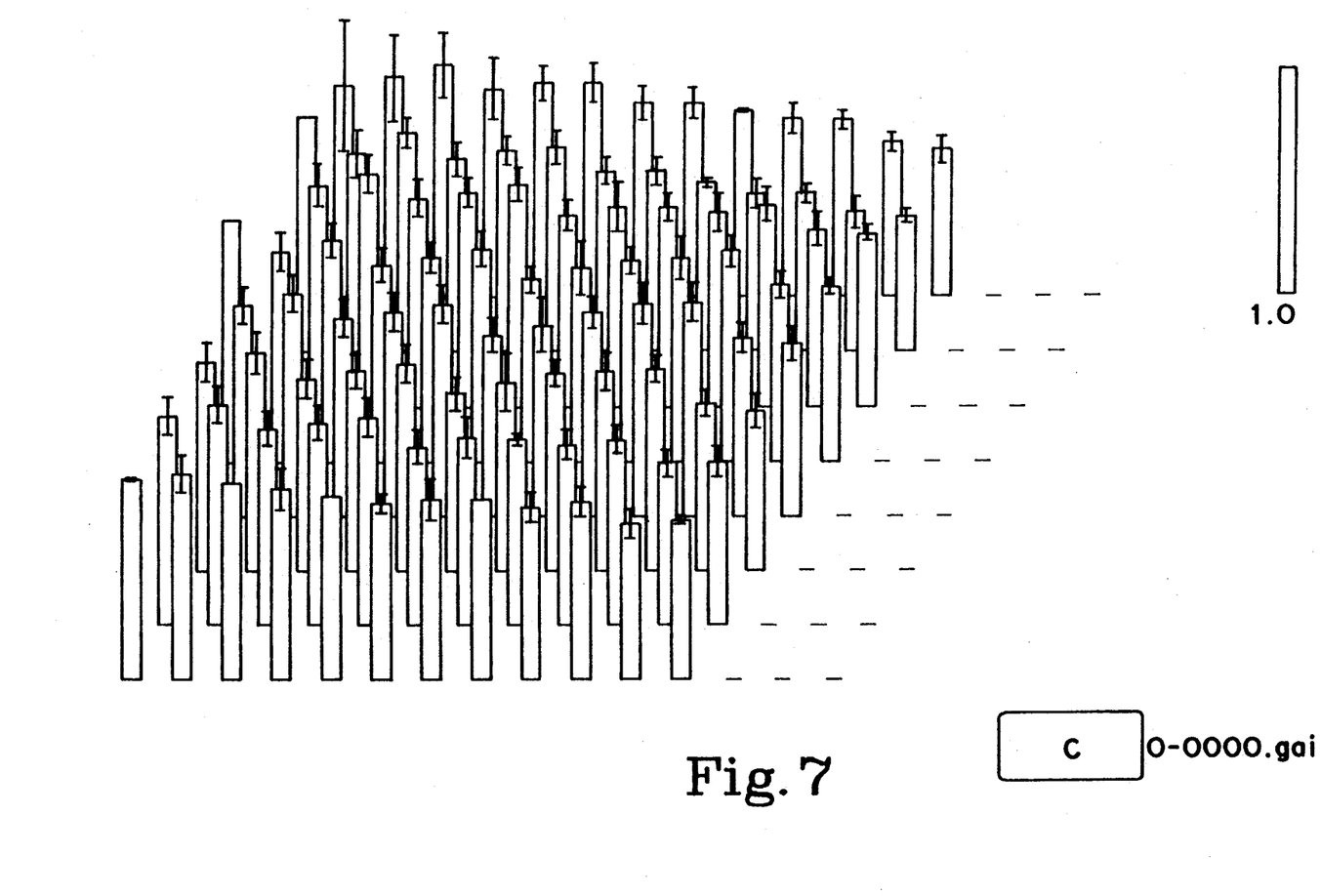
Figure 8:
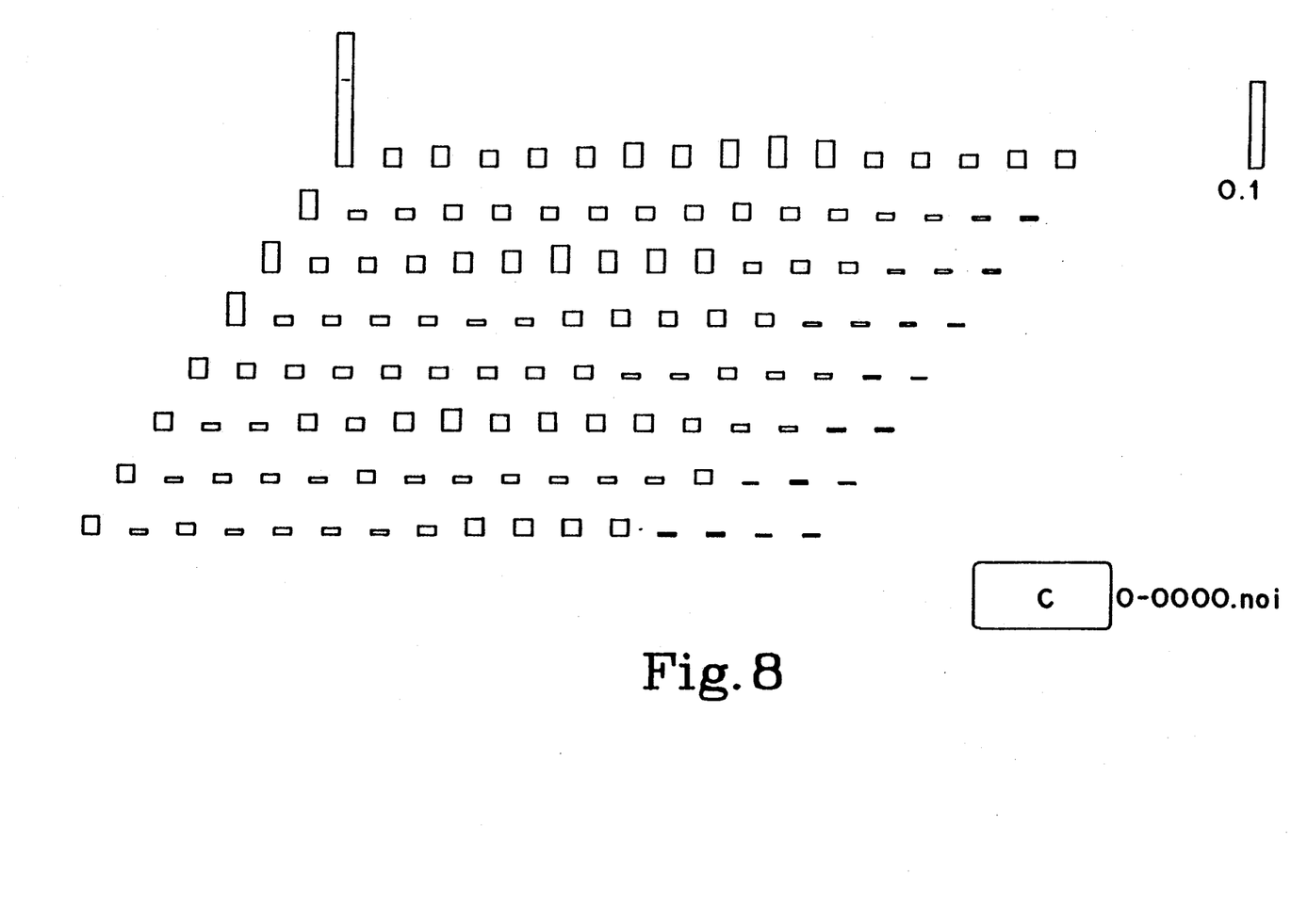

FIGS. 7 and 8, marked C0-0000.gai and C0-0000.noi, represent a second video codec. The frequency response plot shows a fairly flat response with the gain ratio exceeding 0.5 at all locations. The noise plot shows noise contribution at all spatial frequencies other than [0,0] to be below 5%. The larger bar at [0,0] indicates errors in DC level in some blocks.

Figure 6:
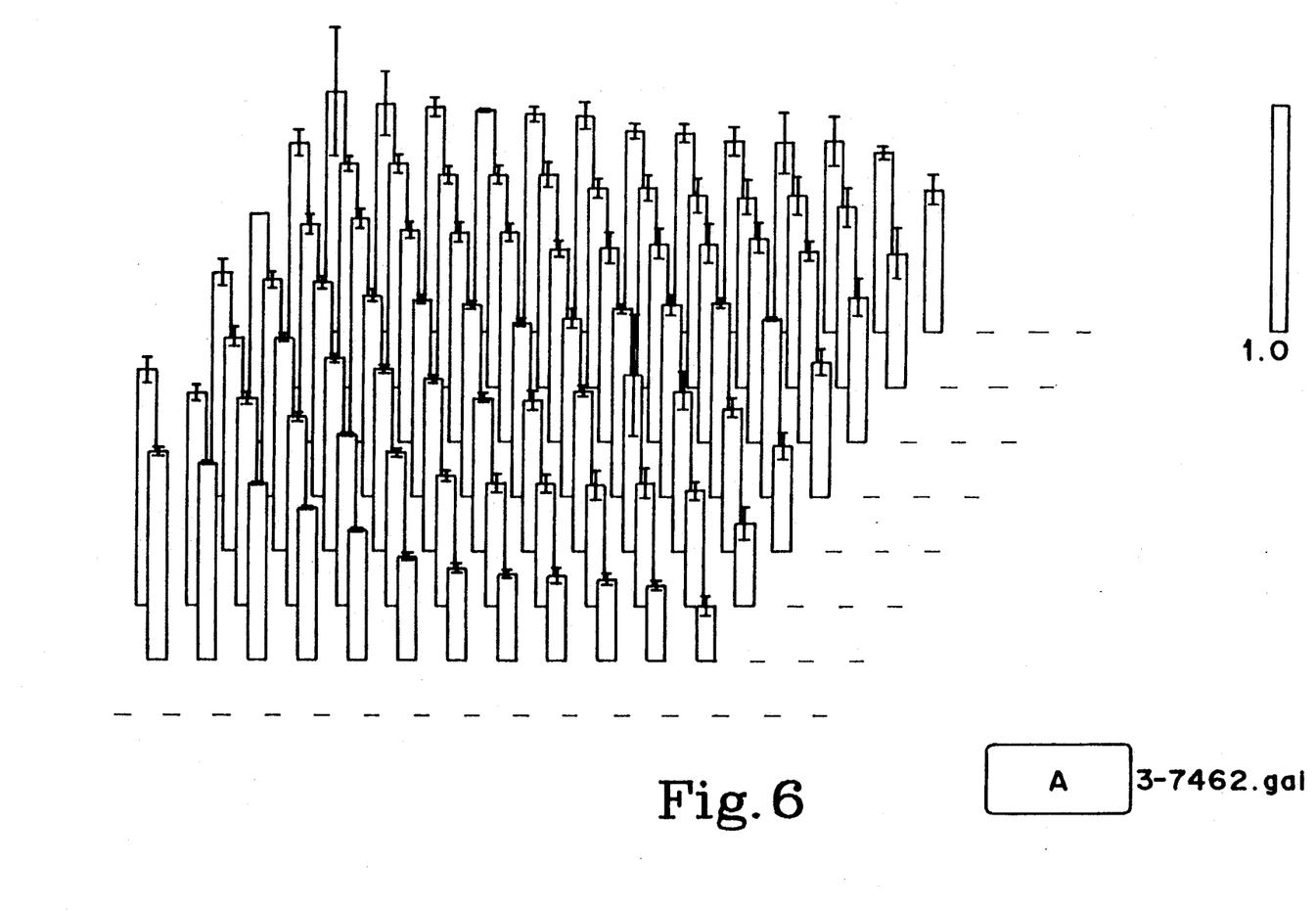
Figure 9:
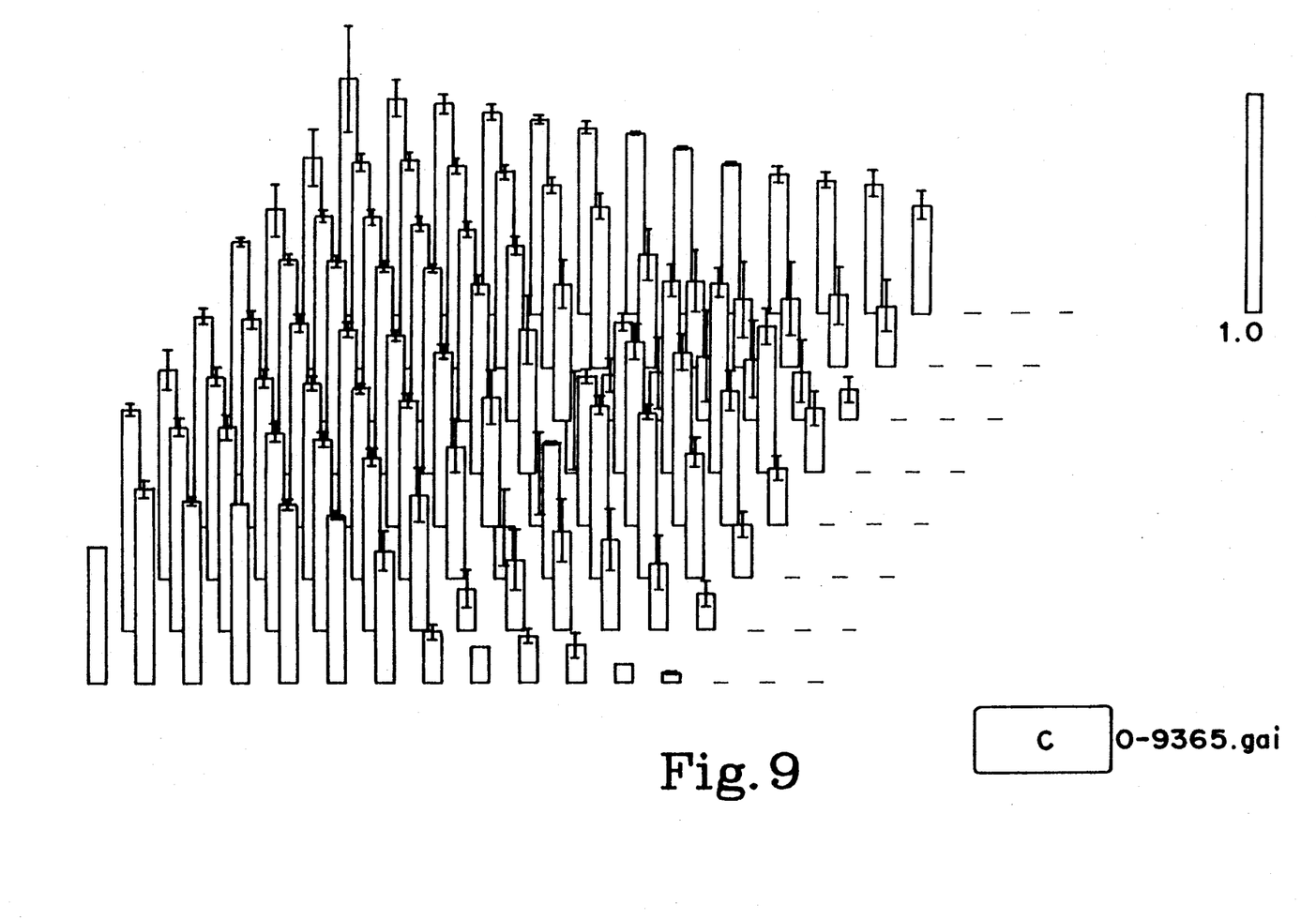

The numeral after the video codec identifying letter, n-nnnn, indicates a pattern using $K_t = n.nnnn$ c/aph. Some codecs, such as that shown in FIG. 9, show very little change in frequency response or noise with temporal frequency $K_t$. This codec probably does no inter-frame coding. Some, such as that shown in FIG. 6, show degradations at a particular temporal frequency. This effect may be related to the algorithm used for inter-frame coding.

As shown from FIGS. 4-9 spatial bandwidth testing for video codecs according to the present invention differentiates between codecs, as the shapes of the spatial frequency response and noise plots differ greatly between codecs. Other high entropy test patterns than the zoneplate pattern, such as radial patterns, etc., may be used so long as the pattern includes all combinations of horizontal and vertical spatial frequencies.

Thus the present invention provides spatial bandwidth testing for digital data-compressed video systems by comparing a portion of the video output from the video system in response to a high entropy test signal with a corresponding control video portion derived directly from the high entropy test signal, and presenting the results in displays representing gain and noise responses as a function of frequency to objectively characterize the digital data-compressed video system being tested.

What is claimed is:

1. A method of spatial bandwidth testing for a digital data-compressed video system comprising the steps of:
    generating a complex test signal having a range of frequencies in each of the horizontal, vertical and temporal dimensions;
    applying the complex test signal to the input of the video system;
    acquiring a portion of the complex test signal as a control frame and a corresponding portion of the output from the video system as a test frame;
    dividing the control and test frames into corresponding blocks of pixel data;
    obtaining an array of spectral coefficients for each block to produce a reference array of coefficients for blocks from the control frame and a test array of coefficients for blocks from the test frame;
    comparing the reference array and the test array to obtain a ratio between the corresponding coefficients; and
    plotting the ratios to provide a visual display of characteristics of the video system.

2. A method as recited in claim 1 wherein the complex test signal comprises a modified zoneplate signal having a range of frequencies from a minimum to a maximum value in both horizontal and vertical directions.

3. A method as recited in claim 2 wherein the minimum frequency value in both horizontal and vertical directions occurs at the upper left-hand corner of a video display of the modified zoneplate signal.

4. A method as recited in claim 2 wherein the minimum frequency value in both horizontal and vertical directions occurs at the middle of the left-hand side of a video display of the modified zoneplate signal.

5. A method as recited in claim 1 wherein the portion of the complex test signal and the corresponding portion of the video system output comprise one frame of video data.

6. A method as recited in claim 1 wherein the obtaining step comprises the step of determining the maximum coefficient for each block of the control array.

7. A method as recited in claim 6 wherein the comparing step comprises the step of determining a gain characteristic for the video system as a function of the ratio of the corresponding test coefficients to the coefficients of the control array that exceed a given percentage of the value of the maximum coefficients for each block.

8. A method as recited in claim 6 wherein the comparing step comprises the step of determining a noise characteristic for the video system as a function of the ratio of the difference between the corresponding test coefficients and the control coefficients less than a given percentage of the value of the maximum coefficients for each block to the maximum coefficient for each block 9. A method as recited in claim 8 wherein the comparing step further comprises the step of determining a gain characteristic for the video system as a function of the ratio of the corresponding test coefficients to the coefficients of the control array that exceed a given percentage of the value of the maximum coefficients for each block.

* * * * *